United States Patent [19]

Dykstra

[11] Patent Number: 4,875,448

[45] Date of Patent: Oct. 24, 1989

[54] CYCLIC RESPONDING ELECTRONIC SPEED GOVERNOR

[75] Inventor: Richard A. Dykstra, Cedar Grove, Wis.

[73] Assignee: Briggs & Stratton Corporation, Wauwatosa, Wis.

[21] Appl. No.: 249,341

[22] Filed: Sep. 23, 1988

[51] Int. Cl.[4] ........................ F02D 41/16; B60K 31/00

[52] U.S. Cl. ................................ 123/352; 364/426.01

[58] Field of Search ........................ 123/352; 180/179; 364/426, 431.01

[56] References Cited

U.S. PATENT DOCUMENTS 4,470,478 9/1984 Hyashi et al. ........................ 123/352
4,471,735 9/1984 Colloria ................................ 123/352
4,488,525 12/1984 Tsutsuoni et al. .................. 123/352
4,520,778 6/1985 Nanso et al. ........................ 123/352
4,577,718 3/1986 Vano .................................. 123/352
4,619,232 10/1986 Morris ................................ 123/352
4,707,792 11/1987 Naiton ................................ 123/352
4,771,749 9/1988 Kiuchi et al. ....................... 123/352

*Primary Examiner*—Raymond A. Nelli
*Attorney, Agent, or Firm*—Andrus, Sceales, Starke & Sawall

[57] ABSTRACT

Each time throttle actuator current changes, a control voltage input to a control timer also temporarily changes. As a result, the desired set speed is temporarily changed during changes in engine throttle position so that system stability is maintained without the use of any permanent speed droop. System gain can be varied by changing the frequency of the gated oscillator while system stability can be controlled by varying the RC time constant in the differentiator network.

24 Claims, 7 Drawing Sheets

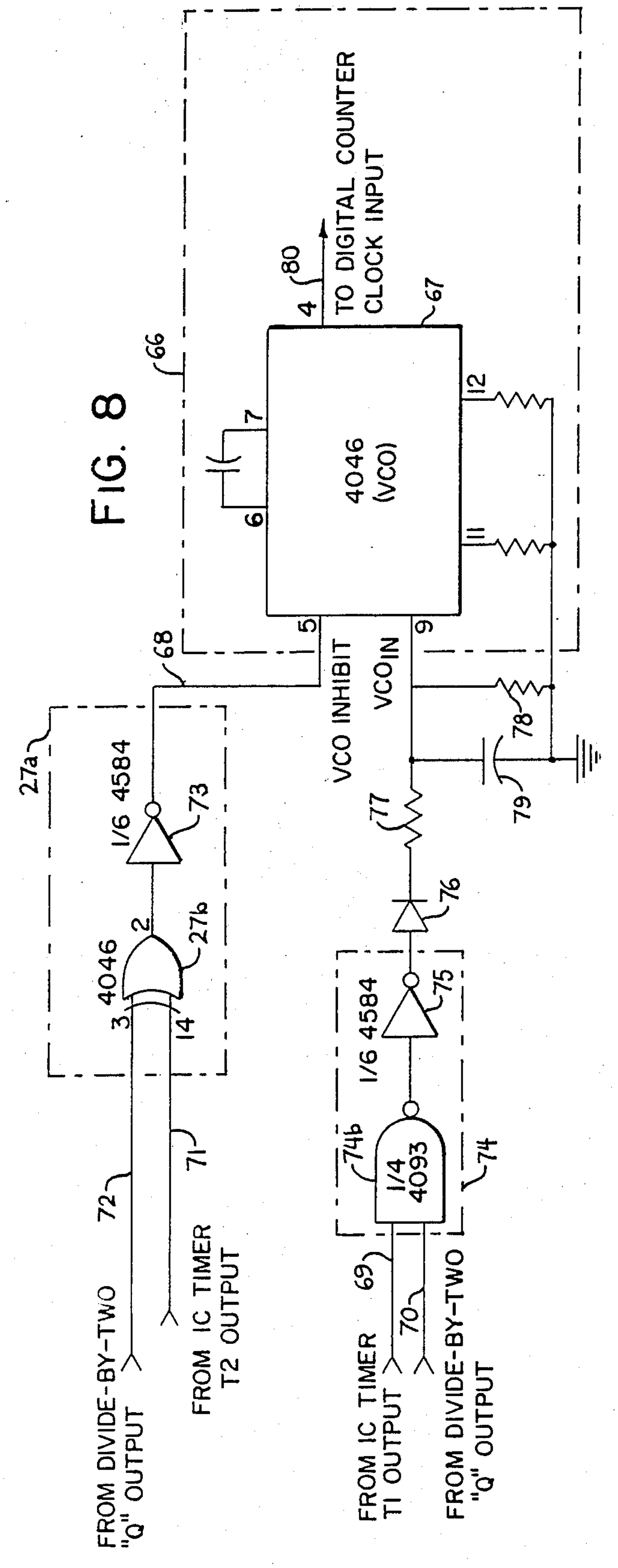
FIG. 8
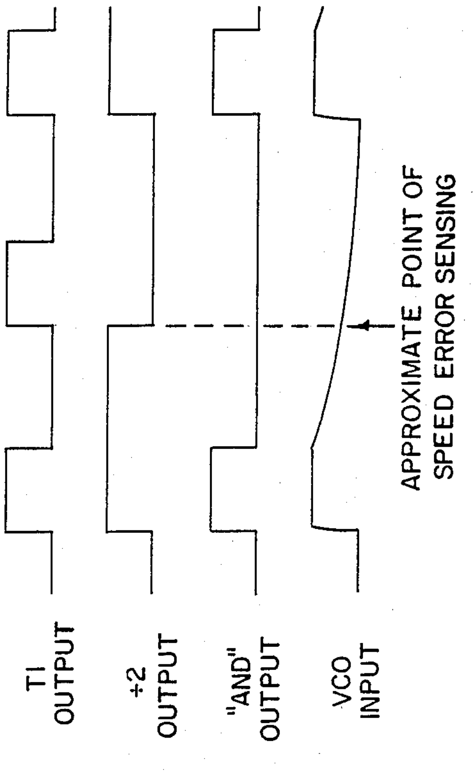
FIG. 10(a)
FIG. 10(b)
FIG. 10(c)
FIG. 10(d)
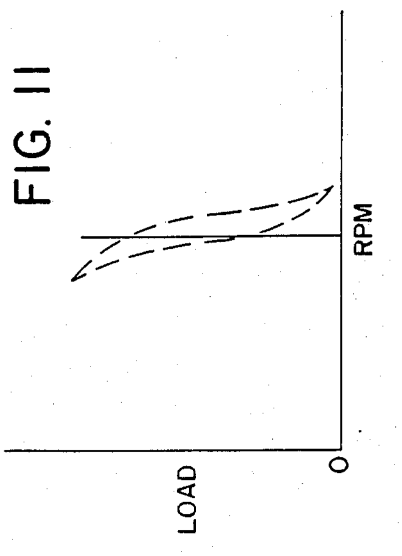
FIG. 11

TYPICAL ELECTRONIC GOVERNOR WAVEFORMS

CYCLIC RESPONDING ELECTRONIC SPEED GOVERNOR

BACKGROUND OF THE INVENTION

The present invention relates to speed governors, and more particularly to a cyclic responding electronic speed governor for power producing, transferring and absorbing devices, and specifically for internal combustion engines.

Automatic devices that cause apparatus such as power producing, transferring and absorbing machines to operate at a fixed speed are well known in the art. Such automatic devices are commonly referred to as "speed governors". Typically, such speed governors are either of the mechanical type or the electronic type.

Various types of mechanical governors are well known in the art. However, when a load is applied to a power producing device such as an internal combustion engine that is controlled by a simple mechanical governor, the speed or rpm of the engine decreases significantly below the no load speed or rpm. To reduce speed droop upon loading, the sensitivity of mechanical governors may be increased. However, as the mechanical sensitivity of the governor is increased, the engine and control mechanism tend to become unstable.

Electronic speed governors are also well known in the art. Such electronic devices permit more accurate control of engine speed and minimize engine speed droop with load while at the same time decreasing engine instability. Examples of such devices may be found in the following U.S. Pat. Nos.:

| U.S. Pat. No. | Inventor | Issue Date |
|---|---|---|
| 4,058,094 | Moore | 11-15-1977 |
| 4,155,277 | Minami et al | 05-22-1979 |
| 4,252,096 | Kennedy | 02-24-1981 |
| 4,292,943 | Kyogoku et al | 10-06-1981 |
| 4,307,690 | Rau et al | 12-29-1981 |
| 4,399,397 | Kleinschmidt, Jr. | 08-16-1983 |
| 4,436,076 | Piteo | 03-13-1984 |
| 4,448,179 | Foster | 05-15-1984 |
| 4,465,046 | May | 08-14-1984 |
| 4,508,075 | Takao et al | 04-02-1985 |
| 4,524,843 | Class et al | 06-25-1985 |
| 4,531,489 | Sturdy | 07-30-1985 |
| 4,532,901 | Sturdy | 08-06-1985 |
| 4,572,150 | Foster | 02-25-1986 |

SUMMARY OF THE INVENTION

This invention is an improved electronic speed governor for automatically controlling the speed of power producing, transferring and absorbing devices, particularly internal combustion engines. The system is capable of sensing and adjusting the speed of the device to maintain a virtually constant speed, even upon loading. In the particular application described, namely, controlling an internal combustion engine, the system is capable of sensing and adjusting engine speed as frequently as once per engine cycle, and provides temporary droop during changes in engine throttle position making it possible to provide isochronous governing.

The electronic speed governor system includes a signal input means for producing a source input signal indicative of actual speed, control means responsive to the source input signal and a control input signal for producing a control output signal indicative of a desired speed, comparator means for comparing the source input signal with the control output signal to produce an error signal proportional to the difference between the source input signal and the control output signal, oscillator means responsive to the error signal for producing a timing signal proportional to the error signal, counter means responsive to the timing signal and a delayed source input signal for producing a continuous counter output signal, and actuator means responsive to the counter output signal for adjusting the actual speed.

The source input signal may comprise a pulse derived from an ignition system, if an internal combustion engine is employed, or may comprise a pulse derived from an alternator winding, if an alternator on an engine or alternator powered by an engine is employed. The source input signal may also be obtained using other sensing means depending upon the type of device employed, i.e. other power producing machines such as electric motors, power absorbing devices such as clutches and brakes, or power transferring apparatus such as continuous variable transmissions or the like. A conditioner means such as a timer for producing a fixed pulse width output signal is typically employed to shape the input signal into a desired waveform, and a divide-by-two circuit is employed in series with the conditioning timer to provide an output pulse having a pulse width indicative of the actual speed.

The control means may include a timer for producing the control output signal and a differentiator circuit for detecting a change in the source input signal and for producing a trigger signal to the control timer. Power for the control input signal to the control timer may be supplied by a source of voltage such as a battery, alternator or DC power supply.

When employed with an internal combustion engine, the counter typically comprises a digital counter, and the output of the digital counter is converted to an analog signal by a digital to analog converter to control a throttle actuator through a power transistor. A low value feedback resistor, in series with the power transistor's emitter lead, provides a voltage signal that is proportional to actuator current, and an RC differentiator circuit is connected across the feedback resistor with the differentiator's resistor part of the control timer's control voltage supply. As a result, each time throttle actuator current changes, the control timer's control voltage input changes temporarily. In this way, desired speed or set speed is temporarily changed during changes in engine throttle position, and system stability is maintained without the use of any permanent speed droop.

The comparator means preferably comprises an exclusive OR gate, and the oscillator means may comprise either a fixed frequency gated oscillator or a variable frequency gated oscillator. Preferably, the variable frequency gated oscillator comprises a voltage controlled oscillator whose gate is controlled by the error signal and whose input is controlled by the source input signal and an RC network. System gain can be varied by changing the frequency of the gated oscillator, while system stability may be controlled by varying the RC differentiator network that is connected across the feedback resistor.

BRIEF DESCRIPTION OF THE DRAWINGS

The drawings illustrate the best mode presently contemplated of carrying out the invention.

In the drawings:

FIG. 8 is a schematic diagram illustrating typical electronic circuitry of the exclusive OR gate and variable frequency gated oscillator in FIG. 7;

FIGS. 10(*a*)–10(*d*) are graphs of the time relationship of numerous signal waveforms at various locations of the electronic governor circuitry of FIG. 7; and FIG. 11 is a graph of load versus rpm illustrating the performance of the present electronic governor in solid lines and the droop of typical prior art governors in dashed lines.

DESCRIPTION OF THE PREFERRED EMBODIMENT

Figure 1:
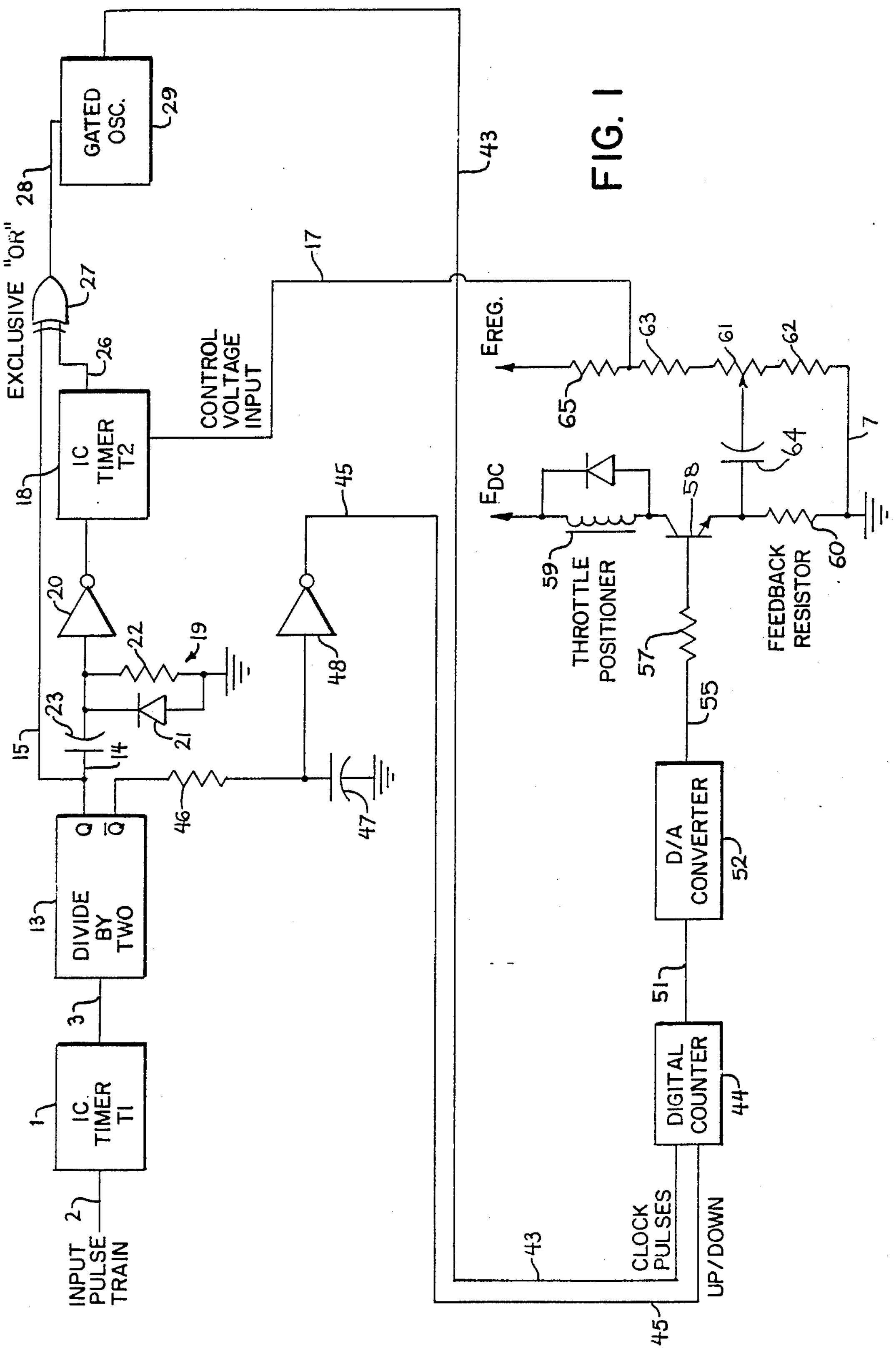
FIG. 1 is a schematic block diagram of the electronic speed governor of the present invention having fixed system gain.

Referring now to the drawings, FIG. 1 illustrates an electronic speed governor system constructed in accordance with the principles of the present invention. It should specifically be noted that the governor of the present invention will be described herein in connection with controlling the speed of an internal combustion engine. However, the present description is for illustrative purposes only, and the governor of the present invention may also be utilized in connection with various types of power producing, transferring and absorbing devices. For example, the governor of the present invention may not only be utilized in connection with internal combustion engines, but may also be employed to regulate or control the speed of electric motors, electric generators, clutches, brakes, and continuous variable transmissions. Thus, the electronic speed governor system of the present invention is not limited in scope to engines, but rather may be employed with other types of power apparatus as noted above.

Referring now to FIG. 1, integrated circuit timer 1 is employed to condition an input signal from line 2 so as to produce a fixed pulse width output signal in line 3. The output from timer 1 is represented by the waveform shown in FIG. 9(*b*) while the input signal is represented by the waveform in FIG. 9(*a*). The input signal preferably comprises a pulse derived from an internal combustion engine's ignition system, specifically a one pulse per revolution evenly spaced ignition primary pulse from a small internal combustion engine. However, as specifically noted previously herein, the input signal may alternately be derived from an alternator winding if the governor of the present system is employed with an alternator on an internal combustion engine or an alternator powered by an internal combustion engine. Other sources of the input signal are also possible depending upon the apparatus with which the present governor system is employed.

Figure 2:
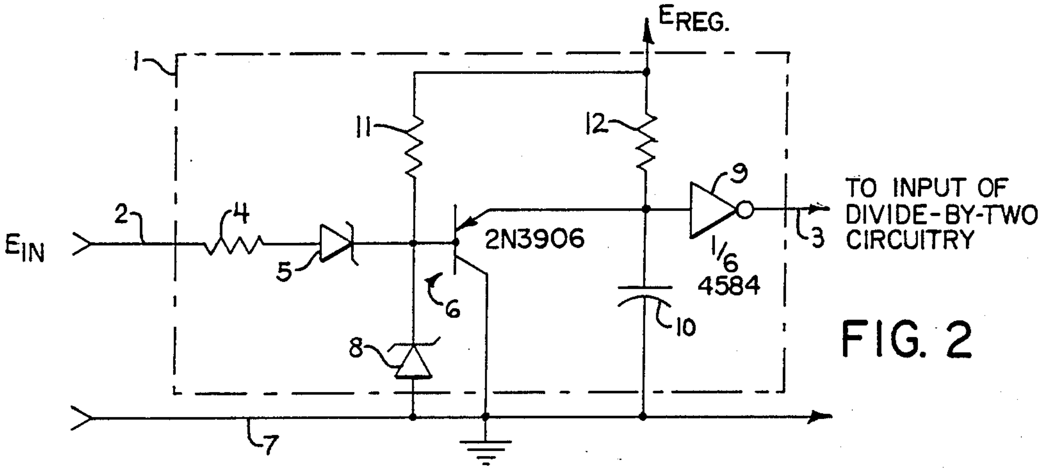
FIG. 2 is a schematic diagram illustrating typical circuitry for the input signal conditioning timer in FIG. 1.

Referring now to FIG. 2, there is illustrated a typical circuit diagram for timer 1. As illustrated, the circuitry in FIG. 2 is selected to provide input signal conditioning for a negative going signal, i.e. a signal derived from an engine's ignition primary. However, timer 1 may also be readily modified to condition a positive going signal, if desired. As shown the circuitry of timer 1 includes a resistor 4 in series with a zener diode 5 in line 2, which controls the base of a PNP transistor 6. The collector of transistor 6 is connected to a common ground 7, and a second zener diode 8 is connected across the common ground 7 and line 2 between zener diode 5 and the base of transistor 6 (which may, for example, be a model 2N3906). Transistor 6 is controlled by the voltage difference between capacitor 10 and zener diode 8, and the output of inverter gate 9 (which may be 1/6th of a model 4584) provides a fixed pulse-width output signal in line 3 from timer 1. The capacitor 10 is connected across the emitter of transistor 6 and common ground 7 between transistor 6 and inverter gate 9. The timing cycle starts when capacitor 10 discharges through transistor 6. A pair of resistors 11, 12 are connected from the base and emitter of transistor 6 to a voltage source, with the value of resistor 12 preferably selected to provide a 10 to 12 millisecond output pulse width from timer 1.

Figure 3:
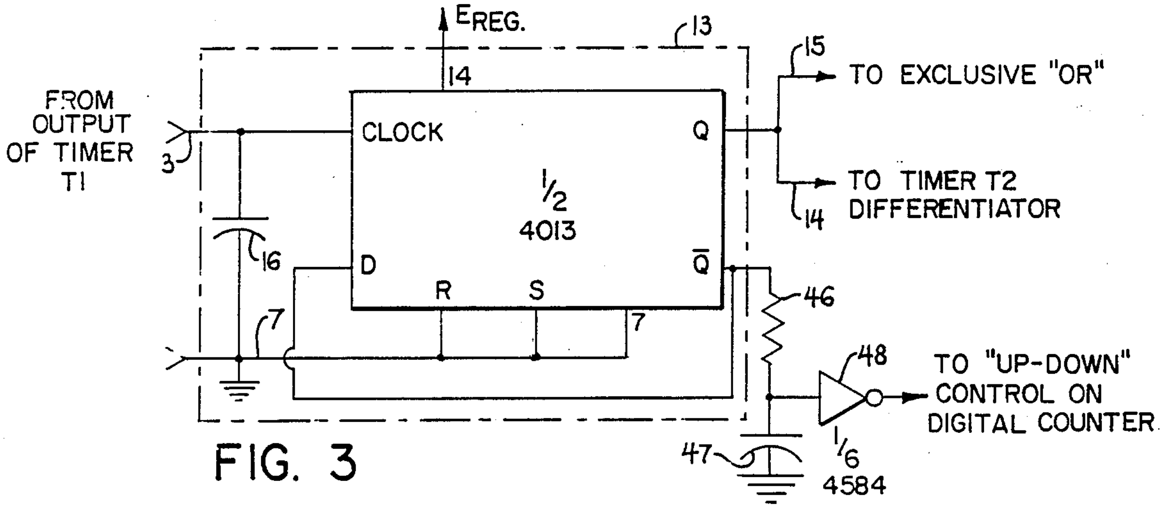
FIG. 3 is a schematic diagram illustrating typical circuitry for the divide-by-two circuit in FIG. 1.
Figures 9A, 9B, 9C, 9D, 9E, 9F, 9G, 9H:
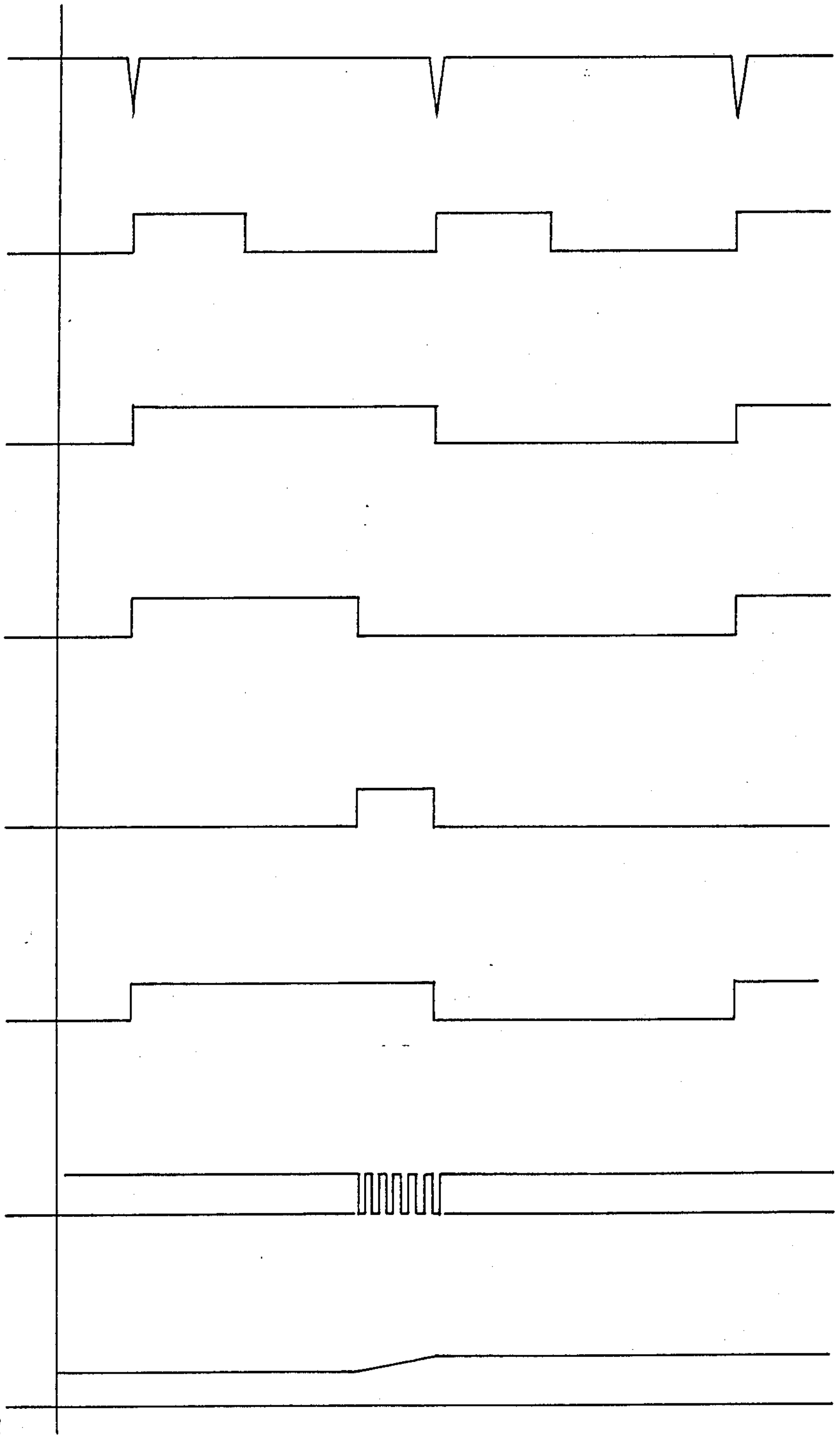
FIGS. 9(*a*)–9(*h*) are graphs of the time relationship of numerous signal waveforms at various locations of the electronic governor circuitry of FIG. 1.

Referring now to FIGS. 1 and 3, the fixed pulse width output signal carried in line 3 drives a divide by two circuit 13 which produces an output pulse having a pulse width indicative of actual speed, as shown by the wave form in FIG. 9(*c*). The output pulse from divide by two circuit 13 is carried via line 14 to a control circuit, which will hereinafter be described, and via line 15 to an exclusive OR gate, which will also hereinafter be described.

As best shown in FIG. 3, divide by two circuit 13 typically comprises one half of a model 4013 integrated circuit. Note also that circuit 13 includes a capacitor 16 connected across line 3 and common ground 7. Alternately, circuit 13 may comprise a divide-by-four or divide-by-eight circuit or other similar circuits. Therefore, circuit 13 may be appropriately described as a divide-by-$2^n$ circuit where n is an integer other than zero.

The control circuitry previously mentioned is responsive to the source input signal, which is represented by the output of divide by two circuit 13, and a control input signal, which comprises a control voltage in line 17 for producing a control output signal indicative of a desired speed. The control circuitry comprises a timer 18 connected in series with a differentiator circuit 19 and an inverter gate 20.

Figure 4:
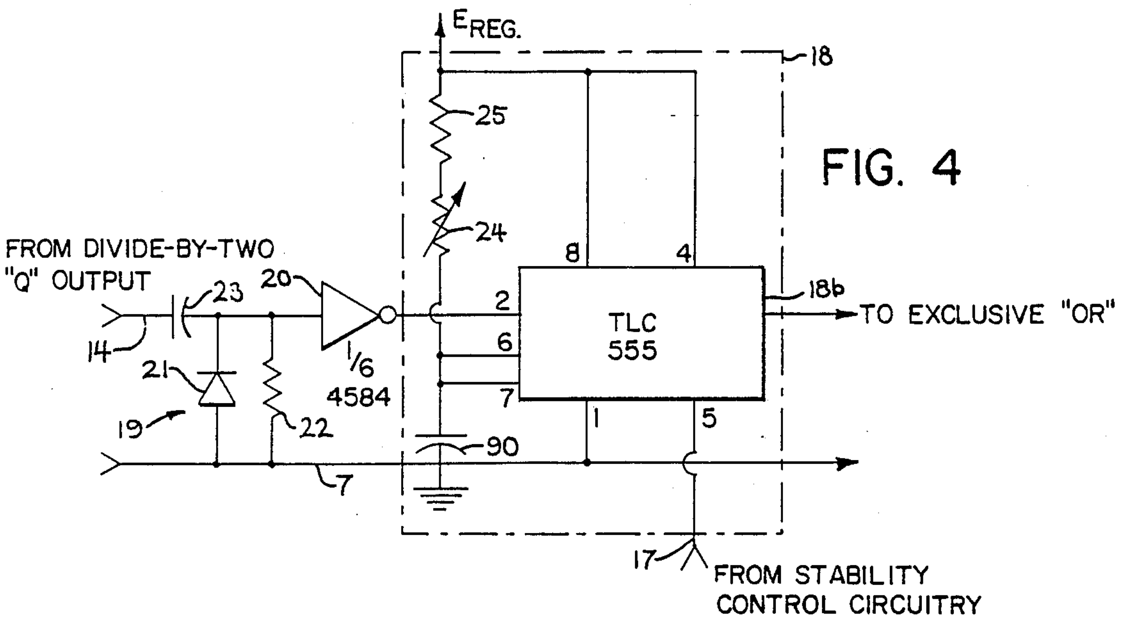
FIG. 4 is a schematic diagram illustrating typical circuitry for the control timer in FIG. 1.

Referring more specifically to FIG. 4, timer 18 typically comprises a model TLC 555 integrated circuit 18*b*, while inverter gate 20 comprises 1/6th of a model 4584 integrated circuit. Differentiator 19 includes a capacitor 23 connected in series with a diode 21 and resistor 22 with the differentiator 19 connected across input line 14 and common ground 7. A variable resistor 24 in series with another resistor 25 and a capacitor 90, completes the circuitry with the values of resistors 24, 25 and capacitor 90 selected as necessary for the desired speed range to be regulated. The output from timer 18 is represented by the waveform in FIG. 9(*d*) and is indicative of a desired set speed.

The output from timer 18 carried in line 26 comprises one of the inputs to an exclusive OR gate 27 with the other input comprising a signal carried in line 15 and represented by the waveform in FIG. 9(*c*). Exclusive OR gate 27 functions to compare the source input signal represented by the output from divide by two circuit 13 and carried in line 15 with the control output signal or set speed signal represented by the waveform in FIG. 9(*d*) and carried in line 26. By comparing these two signals, exclusive OR gate 27 produces an error signal which is proportional to the difference between the source input signal and the control output signal. The error signal is represented by the waveform in FIG. 9(*e*) and is carried in line 28 to control a gated oscillator 29.

Figure 5:
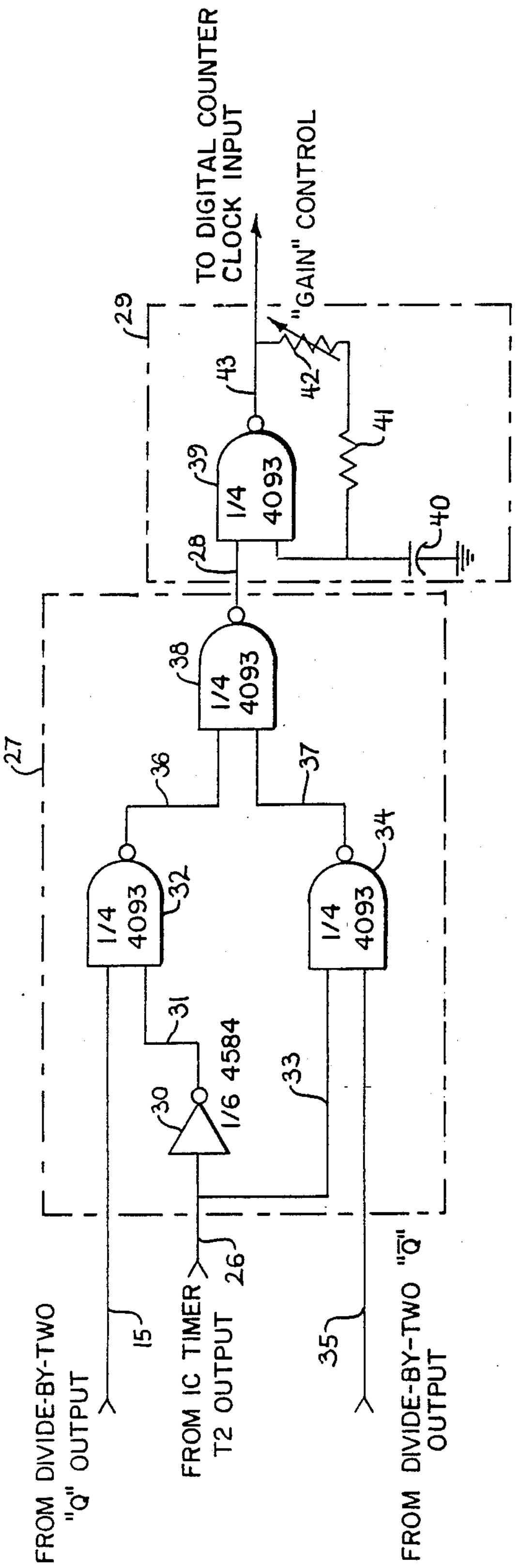
FIG. 5 is a schematic diagram illustrating typical circuitry for the exclusive OR gate and fixed frequency gated oscillator in FIG. 1.

Referring to FIG. 5, there is illustrated typical circuitry for gate 27 and oscillator 29. More specifically, gate 27 includes an inverter gate 30 whose input comprises the signal from timer 18 carried in line 26. Inverter gate 30 comprises 1/6th of a model 4584 integrated circuit. The output from inverter gate 30 is carried via line 31 and represents one input to a NAND gate 32, which comprises one-fourth of a model 4093 integrated circuit. The other input to gate 32 comprises the output from divide by two circuit carried in line 15 and represented by the waveform in FIG. 9(*c*). The output from timer 18 also provides one of the inputs via line 33 to another NAND gate 34 which also comprises one-fourth of a model 4093 integrated circuit. The other input to gate 34 is provided by line 35 which represents the inverted output from divide by two circuit 13. The output from gates 32 and 34 communicate via lines 36,37 to provide a pair of inputs to another NAND gate 38 which also comprises one-fourth of a model 4093 integrated circuit. The output from gate 38 comprises the signal represented by the waveform shown in FIG. 9(*e*) and carried by line 28 as one input to a NAND gate 39 for gated oscillator 29. NAND gate 39 comprises one-fourth of a model 4093 integrated circuit. The other input to NAND gate 39 comprises a gain control circuit having a capacitor 40, resistor 41 and variable resistor 42. Thus, system gain can be varied by changing the frequency of the gated oscillator 29 by varying the resistance of resistor 42. Oscillator 29 functions as a clock pulse generator whose output is represented by the waveform illustrated in FIG. 9(*g*) and carried in line 43 to one of the inputs of a digital counter 44.

Digital counter 44 is not only responsive to the timing signal or clock pulses in line 43, but is also responsive to the source input signal via line 45 from the inverted output of divide by two circuit 13. This signal, referred to herein as the up/down control circuit signal is first conditioned by an RC network comprising resistor 46 and capacitor 47 to delay the signal in order to add dither to overcome mechanical friction. Thereafter, the signal passes through an inverter gate 48 before communicating with digital counter 44. As shown best in FIG. 6, digital counter 44 typically may comprise a pair of model 4516 integrated circuits.

The output from digital counter 44 comprises a continuous counter output signal in line 51 which drives a digital to analog converter 52.

Digital counter 44 is designed to provide upper and lower count limits. This keeps counter 44 from cycling to minimum count on the next clock pulse following the counter's maximum count value, and keeps counter 44 from cycling to maximum count on the next clock pulse following the counter's minimum count value. When used with the governor system's digital-to-analog converter 52, the count limits provide maximum and minimum analog voltages for controlling the sytem's power semiconductor or transistor 58.

Figure 6:
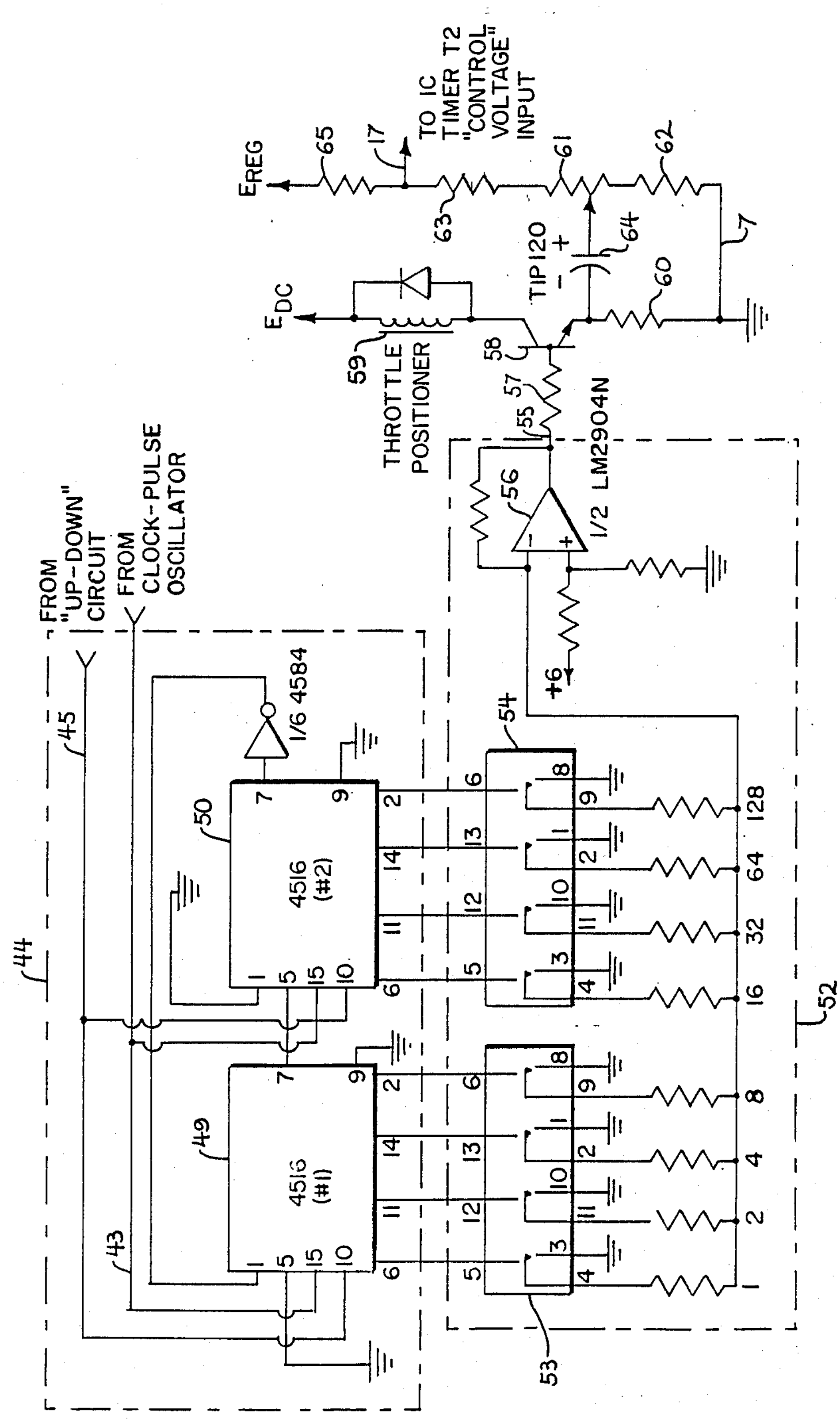
FIG. 6 is a schematic diagram illustrating typical circuitry of the counter, digital to analog converter and stability control in FIG. 1.

For the typical circuit configuration shown in FIG. 6, maximum and minimum count values are established by the proper interconnection of the two 4516 binary counters and the routing of the counters' preset lines (to either the supply voltage or system ground). It is recognized, however, that count limits may be established by alternative means with other digital counters.

The up/down control circuitry determines whether the digital counter's output count value will increase or decrease during each governor operating cycle. For the circuitry shown in FIGS. 1 and 6, a high-state input to the counter's up/down control will cause counter 44 to count up and a low-state input will cause counter 44 to count down. If opposite high/low inputs are required (for an alternative digital counting means), the control circuitry can be appropriately modified to accommodate the situation.

With respect to FIGS. 1 and 6, the up/down control signal in line 45 is derived by conditioning the inverted output of the system's divide-by-two circuit 13. The conditioned up/down signal, which is represented by line 45 in the drawings, is at a high state during the time the system's clock-pulse oscillator 29 is gated "on" if engine speed is below desired speed, and is at a low state during the time the clock-pulse oscillator 29 is gated "on" if engine speed is above desired speed. The counter's output count value changes during each governor operating cycle, with the new count value depending on whether actual engine speed was found to be too low or too high during the speed-sensing portion of the operating cycle.

The counter output is converted to an analog signal by the governor system's D/A converter 52. As illustrated in the drawings, the analog signal is used to control a power semiconductor 58 which, in turn, controls an engine throttle positioner. Since the governor system continually updates the control signal as required to maintain constant speed, there is no need for a separate bias control in the system.

It is recognized that optional output control means (pulse-width-modulation, stepping-motor control, etc.) may be used with this governing system's basic sensing and up/down counting circuitry. Also, as mentioned herein, the system can be used in many applications other than controlling an engine's operating speed.

As shown best in FIG. 6, digital to analog converter 52 may comprise a pair of model 4066 analog switches 53, 54 controlled by the outputs from integrated circuits 49,50 respectively. Converter 52 is responsive to the counter output signal from digital counter 44 to produce an analog signal proportional to the counter output signal in line 55. The analog signal in line 55 is represented by the waveform shown in FIG. 9(*h*). This analog signal is the output of an operational amplifier 56 which typically may comprise one-half of a model LM2904N integrated circuit and then through a resistor 57 to the base of a power NPN transistor 58. Transistor 58 may typically be a model TIP 120 semiconductor and has its collector operatively associated with an engine throttle positioner comprising solenoid 59. Alternately, a FET or field effect transistor may be employed to control the engine throttle positioner.

The emitter of transistor 58 is connected to a feedback circuit for temporarily varying the control input signal to timer 18 in response to changes in the analog signal from converter 52. The feedback circuit comprises a feedback resistor 60, an RC differentiator circuit, a voltage divider circuit and a stability control circuit. The RC differentiator circuit typically comprises a potentiometer 61, a resistor 62, a resistor 63 and a capacitor 64 connected across feedback resistor 60. The voltage divider circuit includes a fixed value resistor 65, potentiometer 61, resistor 62 and resistor 63. The voltage divider circuit is thus connected between a voltage source and common ground 7. It should be noted that the variable resistor of potentiometer 61 not only functions in the voltage dividing circuit but also functions to control the time constant of the RC differentiator circuit connected across feedback resistor 60. The stability control circuit includes potentiometer 61, resistor 62 and resistor 63. Resistors 62 and 63 provide resistance when potentiometer 61 is at its limits so as to prevent excessive engine speed oscillation. The voltage source noted above may comprise a battery, an alternator, or a DC power supply depending upon the particular application desired. As shown best in FIG. 6, line 17 is connected between resistors 63 and 65.

In operation, integrated circuit timer 1 is used to condition an input signal pulse train from line 2 (which may be, but is not limited to, a one pulse per revolution, evenly spaced, ignition primary waveform from a small internal combustion engine). The output of timer 1 drives divide by two circuit 13 which results in a square wave output, as shown in FIG. 9(*c*), whose high state and low state time periods are determined by an engine's rotational speed. The RC differentiator circuit at the output of divide by two circuit 13 triggers integrated circuit timer 18 each time the output from divide by two circuit 13 goes to a high state. The time duration of the output pulse from timer 18 is what determines engine "set speed" with a shorter pulse duration representing a higher desired engine speed. Exclusive OR gate 27 compares the outputs of the divide by two circuit 13 (which represents actual engine speed) and integrated circuit timer 18 (which represents desired engine speed) and produces an error signal proportional to the difference. The resultant output error signal is a once per cycle pulse whose pulse width depends on the difference between "set speed" and "actual speed" of an engine. Thus, output pulse width approaches zero when actual engine speed approaches set speed. An output signal from inverter gate 48 indicates whether actual speed is above or below engine set speed.

The output from exclusive OR gate 27 serves as an enabling pulse for gated oscillator 29. The gated oscillator 29 provides clock pulses to digital counter 44. The up/down control for counter 44 is provided by a conditioned and delayed signal via line 45 from divide by two circuit 13. Since the width of the gated oscillator's enabling pulse depends on the difference between the actual speed and set speed, the number of clock pulses provided by gated oscillator 29 during each engine cycle also depends on the difference between actual speed and set speed. Thus, as actual engine speed approaches set sped, the number of clock pulses per cycle approaches zero.

The output of digital counter 44 is converted to an analog signal that controls throttle actuator solenoid 59 through power transistor 58. Feedback resistor 60, in series with the emitter of transistor 58 provides a voltage signal that is proportional to actuator current. The RC differentiator circuit connected across feedback resistor 60 is part of the control voltage supply for set speed timer 18. As a result, each time throttle actuator current changes, the control voltage input into timer 18 via line 17 changes temporarily. In this way, set speed is temporarily changed during changes in engine throttle position, and system stability is maintained without the use of any permanent speed droop. System gain can be varied by changing the frequency of the gated oscillator 29, while system stability can be controlled by varying the RC differentiator network connected cross the feedback resistor 60.

Figure 7:
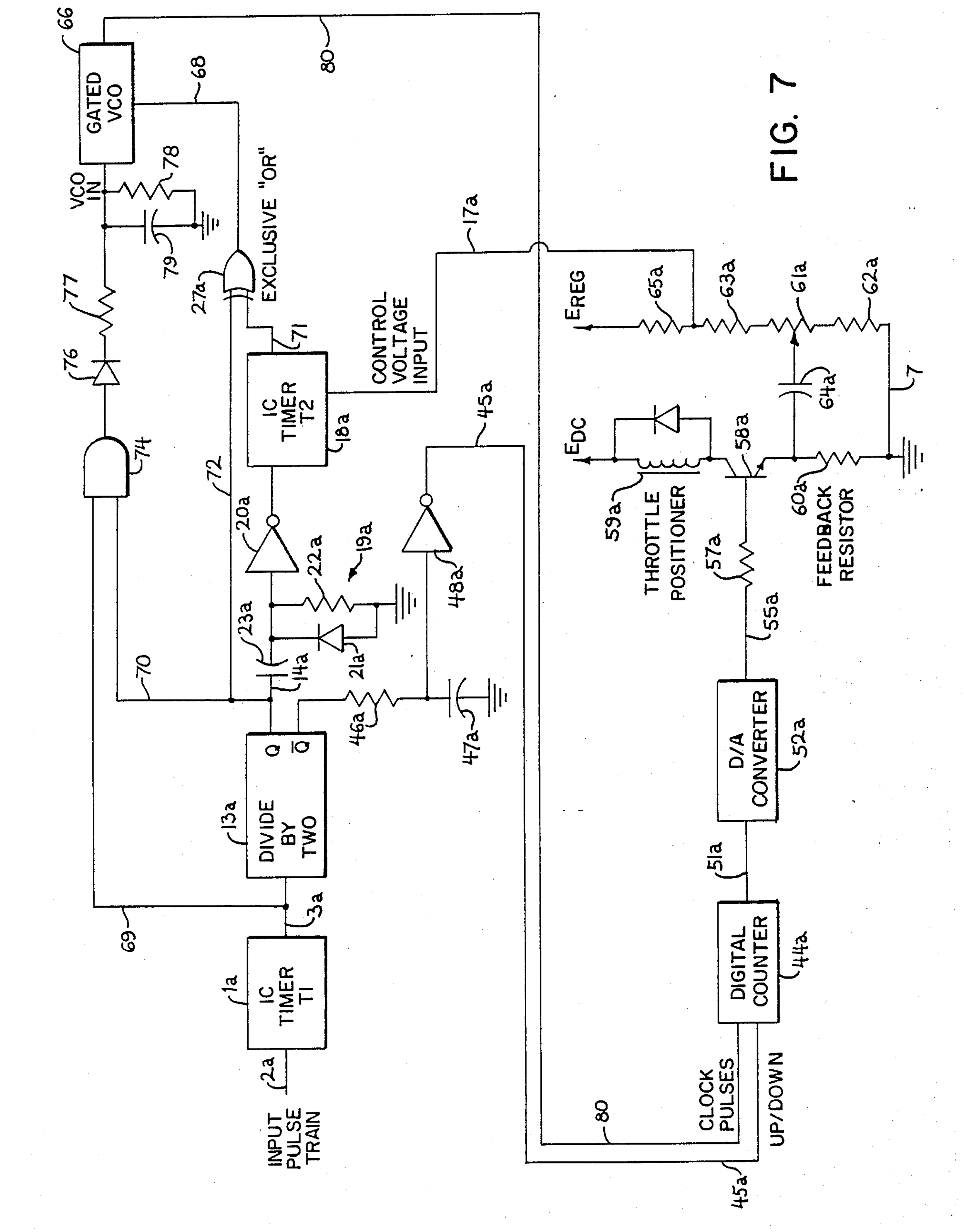
FIG. 7 is a schematic block diagram of a second embodiment of the electronic speed governor of the present invention having variable system gain.

Referring now to FIGS. 7 and 8, there is illustrated a second embodiment of the electronic governor of the present invention. As described above, the governor circuitry illustrated in FIGS. 1–6, and particularly in FIG. 5, represents a fixed gain system. In contrast, the embodiment of FIGS. 7 and 8 illustrate a governor system having a variable gain feature. Referring now to FIG. 7, there is illustrated the governor circuitry for providing the variable gain feature. The circuitry of FIG. 7 is substantially identical to the circuitry shown in FIG. 1, with the exception of the variable gain feature, and therefore like numerals have been utilized in FIG. 7 with the subscript "a" for like components. However, the variable gain feature of FIGS. 7 and 8 will hereinafter now be described.

As shown in FIGS. 7 and 8, the variable gain feature is provided by a variable frequency gated oscillator 66 which typically comprises a voltage controlled oscillator such as a model 4046 integrated circuit 67 whose gate is controlled by the error signal from exclusive OR gate 27*a* via line 68 and whose input is controlled by the conditioned input signal and source input signal via lines 69 and 70. More particularly, FIG. 8 illustrates an exclusive OR gate 27*a* which comprises a model 4046 integrated circuit gate 27*b* whose inputs comprise the output from timer 18*a* via line 71 and the output from divide by two circuitry 13*a* via line 72. The output from gate 27*b* then passes through an inverter gate 73 comprising one-sixth of a model 4584 integrated circuit and then to the gate input of voltage controlled oscillator 67 via line 68.

The signal in line 69 comprises the output of timer 1*a* as represented by the waveform in FIG. 10(*a*) while the signal in lines 70 and 72 comprises the output from divide by two circuit 13*a* as shown by the waveform in FIG. 10(*b*). The signals in lines 69 and 70 are fed to an AND gate 74 which typically comprises one-fourth of a model 4093 integrated circuit NAND gate 74*b* and an inverter gate 75. The output from NAND gate 74*b* passes through inverter gate 75 which typically comprises one-sixth of a model 4584 integrated circuit and the output from inverter gate 75, as represented by the waveform in FIG. 10(*c*), passes through a diode 76 and then through a resistor 77 to the input of oscillator 66. The input to oscillator 66 is also controlled by an RC network comprising a resistor 78 and capacitor 79. This input is represented by the waveform in FIG. 10(*d*). The output from oscillator 66 then communicates via line 80 with digital counter 44*a*.

In operation, the variable gain feature for the governor described with respect to FIGS. 1–6 increasing engine speeds. This makes is possible to have fast governor response at high engine speeds without high frequency oscillations at low engine speeds, without the need for a separate gain potentiometer. The variable gain circuitry incorporates voltage controlled oscillator 67 whose output frequency becomes a function of engine speed by controlling the input voltage of oscillator 67 at the time the governor's speed error signal occurs. The control voltage circuitry of oscillator 67 is powered by a once per cycle pulse whose pulse width is equal to that of the output from timer 1a. The once per cycle signal is obtained by comparing the outputs of timer 1a and divide by two circuitry 13a by means of AND gate 74. Control capacitor 79 charges through diode 76 and resistor 77 while the AND gate 74 output is at a high state. Capacitor 79 then discharges through resistor 78 after AND gate 74 output returns to a low state.

At high engine speeds, the control voltage of oscillator 67 will be relatively high at the point that engine speed sensing occurs since capacitor 79 will have little time to discharge before sensing occurs. As a result, the output frequency from oscillator 67 will be relatively high. At lower engine speeds, however, capacitor 79 will discharge more by the time speed sensing occurs. As a result, the control voltage of oscillator 67 will be significantly lower when speed sensing occurs, and oscillator output frequency will also be lower.

Referring now to FIG. 11, there is illustrated a graph of load versus rpm which represents engine droop upon loading. The performance of the present invention is illustrated in solid lines while the droop of prior art governors is illustrated in dashed lines. As illustrated, the circuitry of the present invention provides isochronous governing.

An electronic speed governing system with fixed as well as variable gain features has been illustrated and described. Various modifications and/or substitutions may be made to the specific components described herein without departing from the scope of the present invention. For example, optional means of providing equivalent circuit functions may be employed.

Various modes of carrying out the invention are contemplated as being within the scope of the following claims particularly pointing out and distinctly claiming the subject matter regarded as the invention.

I claim:

1. An electronic speed governor system, comprising:
- signal input means for producing a source input signal indicative of actual speed;
- control means responsive to said source input signal and a control input signal for producing a control output signal indicative of a desired speed;
- comparator means for comparing said source input signal with said control output signal to produce an error signal proportional to the difference between said source input signal and said control output signal;
- oscillator means responsive to said error signal for producing a timing signal proportional to said error signal;
- counter means responsive to said timing signal and said source input signal for producing a continuous counter output signal; and
- actuator means responsive to said continuous counter output signal for adjusting said actual speed.

2. The governor system of claim 1 wherein said signal input means includes divide-by-$2^n$ circuit means, wherein n is an integer other than zero, for producing an output pulse having a pulse width indicative of said actual speed.

3. The governor system of claim 1 wherein said signal input means includes divide-by-two circuit means for producing an output pulse having a pulse width indicative of said actual speed.

4. The governor system of claim 1 wherein said source input signal comprises a pulse derived from an internal combustion engine's ignition system.

5. The governor system of claim 1 wherein said source input signal comprises a pulse derived from an alternator winding.

6. The governor system of claim 4 wherein said signal input means further includes conditioning means for shaping said ignition pulse into a desired waveform.

7. The governor system of claim 6 wherein said conditioning means comprises a timer for producing a fixed pulse width output signal.

8. The governor system of claim 1 wherein said control means includes a timer for producing said control output signal and differentiator means for detecting a change in the source input signal and for producing a trigger signal to said timer.

9. The governor system of claim 8 wherein said control means further includes a source of voltage for producing said control input signal.

10. The governor system of claim 9 wherein said voltage source is a battery.

11. The governor system of claim 9 wherein said voltage source is an alternator.

12. The governor system of claim 9 wherein said voltage source is a DC power supply.

13. The governor system of claim 9 wherein said actuator means comprises a digital-to-analog converter responsive to said counter output signal to produce an analog signal proportional to said counter output signal and a semiconductor means having an input connected to receive said analog signal and an output operatively associated with an engine throttle positioner.

14. The governor system of claim 13 wherein said semiconductor means comprises a power transistor.

15. The governor system of claim 13 wherein said semiconductor means comprises a field effect transistor.

16. The governor system of claim 14 wherein said power transistor has a collector operatively associated with an engine throttle positioner, an emitter, and an input base connected to receive said analog signal.

17. The governor system of claim 13 wherein said control means further includes feedback circuit means connected between said semiconductor means and said voltage source for temporarily varying said control input signal in response to changes in said analog signal.

18. The governor system of claim 17 wherein said feedback circuit includes a feedback resistor, an RC differentiator circuit connected across said resistor, and a voltage dividing means connected between said voltage source and common ground, said voltage dividing means being responsive to said RC differentiator circuit.

19. The governor system of claim 18 wherein said voltage divider means comprises a fixed resistor and a potentiometer, said potentiometer also controlling the differentiator circuit time constant.

20. The governor system of claim 1 wherein said counter means comprises a binary counter.

21. The governor system of claim 1 wherein said comparator means comprises an exclusive OR gate.

22. The governor system of claim 1 wherein said oscillator means comprises a fixed frequency gated oscillator.

23. The governor system of claim 1 wherein said oscillator means comprises a variable frequency gated oscillator.

24. The governor system of claim 23 wherein said variable frequency gated oscillator comprises a voltage controlled oscillator whose gate is controlled by said error signal and whose input is controlled by said source input signal and a RC network.

* * * * *